United States Patent [19]

Kawabata

[11] 4,062,244
[45] Dec. 13, 1977

[54] PUNCH DEVICE FOR CARD CODING ASSEMBLY

[75] Inventor: Yosei Kawabata, Suwa, Japan

[73] Assignee: Kabushiki Kaisha Suwa Seikosha, Tokyo, Japan

[21] Appl. No.: 625,629

[22] Filed: Oct. 24, 1975

[30] Foreign Application Priority Data

Nov. 5, 1974    Japan .................................. 49-127336

[51] Int. Cl.² ............................................. F16H 25/08
[52] U.S. Cl. ........................................ 74/54; 234/115
[58] Field of Search ........................... 74/54, 128, 142; 234/114, 115, 119

[56] References Cited

U.S. PATENT DOCUMENTS

| | | | |
|---|---|---|---|
| 819,649 | 5/1906 | Ham | 74/54 |
| 1,915,373 | 10/1975 | Sogabe | 234/119 |
| 2,998,913 | 9/1961 | Alonas | 234/115 |
| 3,105,386 | 10/1963 | Eickhoff | 74/128 |
| 3,187,999 | 6/1965 | Seymour | 234/119 |
| 3,233,265 | 2/1966 | Hartmann | 74/54 |
| 3,443,444 | 5/1969 | Frederick | 74/54 |
| 3,538,779 | 11/1970 | Yamamoto | 74/128 |

*Primary Examiner*—Samuel Scott
*Assistant Examiner*—Wesley S. Ratliff, Jr.
*Attorney, Agent, or Firm*—Blum, Moscovitz, Friedman & Kaplan

[57] ABSTRACT

A punch device for coding cards, tapes and the like comprises a pivotably mounted spring biased punch lever, and a punch member for punching a code into a program card or the like movably mounted on one end of the punch lever. An oscillatable yoke is connected to the punch lever through a hammer lever. A rotating eccentric drive rotatably mounted in the yoke continuously oscillates the yoke. An electromagnetically actuable pawl is reciprocably movable against a spring biased trigger lever for pivoting the trigger lever into a position between an end of the hammer lever and the end of the punch lever in which the punch member is movably mounted. When the trigger lever is moved by the pawl between the hammer lever and punch lever, the oscillation of the yoke by the eccentric drive upwardly moves the punch member into a punch position. As the pawl releases the trigger lever, the bias on the trigger lever moves the trigger lever from its position between the hammer lever and punch lever whereby the oscillation of the yoke has no significant effect on the punch member.

8 Claims, 3 Drawing Figures

PUNCH DEVICE FOR CARD CODING ASSEMBLY

BACKGROUND OF THE INVENTION

This invention relates to a punch device for instance of the type that may be used in a keypunch assembly for coding program cards, tapes and the like.

In prior electromagnetically actuated punch pin devices, an electromagnet directly actuates the punch pin. Relatively large quantities of power are consumed in these prior devices, because the electromagnets employed for the purpose of directly actuating the punch pin have a low efficiency. Moreover, the direct action of the electromagnet on the punch pin makes the operation of the device very noisy.

The device of the instant invention overcomes the disadvantages found in these prior punch devices. The device is compact, efficient and substantially noiseless as compared with the conventional devices.

SUMMARY OF THE INVENTION

Generally speaking, in accordance with the invention, a punch device for coding cards, tapes, and the like is provided which comprises a pivotably mounted spring biased punch lever, and a punch member for punching a code into a program card or the like movably mounted on one end of the punch lever. An oscillatable yoke is connected to the punch lever through a hammer lever. A rotating eccentric drive rotatably mounted in the yoke continuously oscillates the yoke. An electromagnetically actuable pawl is reciprocably movable against a spring biased trigger lever for pivoting the trigger lever into a position between an end of the hammer lever and the end of the punch lever in which the punch member is movably mounted.

When the trigger lever is moved by the pawl between the hammer lever and punch lever, the oscillation of the yoke by the eccentric drive upwardly moves the punch member into a punch position. As the pawl releases the trigger lever, the bias on the trigger lever moves the trigger lever from its position between the hammer lever and punch lever whereby the oscillation of the yoke has no significant effect on the punch member.

It is an object of the instant invention to provide an improved punch device for coding cards, tapes and the like.

It is another object of the instant invention to provide an improved punch device which is compact and substantially noiseless as compared with prior conventional devices.

Still other objects and advantages of the invention will in part be obvious and will in part be apparent from the specification.

The invention accordingly comprises the features of construction, combinations of elements and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE INVENTION

Figure 1:
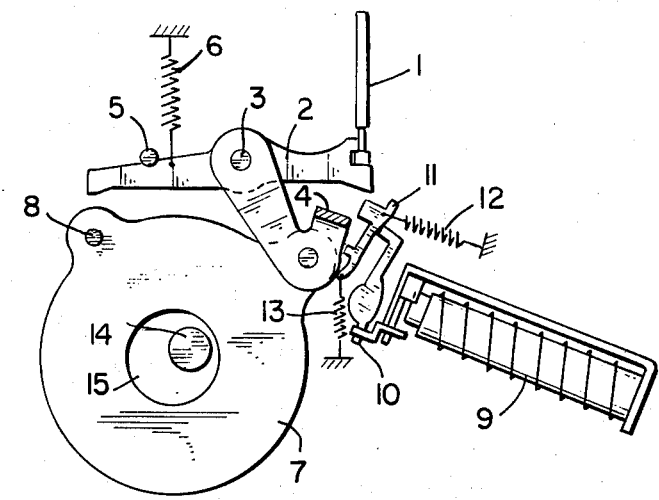
FIG. 1 is a side elevational view, partially in schematic form of a punch device constructed in accordance with the invention, the embodiment being seen in its at rest or normal position.

Referring now to the drawings, a punch lever 2 is substantially centrally pivotably mounted on a pin 3. A spring 6 connected at one end to the lever and connected at an opposite end to a fixed member normally biases lever 2 against a stopper pin 5. The other arm of the lever 2 includes a recess therein for the base section of a punch member 1 which is operatively connected to lever 2.

A hammer lever 4 cooperatively connects a yoke 7 to lever 2 about pivot pin 3. An end of hammer lever 4 is pivotably mounted on pin 3, and a linchpin in the other end thereof connects hammer lever 4 and yoke 7.

An eccentric drive comprising a rotatable shaft 14 and a cam 15 is rotatably mounted in the annulus provided in yoke 7. The annulus in yoke 7 defines a camming surface and the period or frequency with which eccentric 15 rides in that camming surface determines the frequency of oscillation of yoke 7 and hammer lever 4.

A trigger lever 11 is reciprocable between first and second positions. A spring 13 connected at one end to a fixed member and connected at its other end to an end of trigger lever 11 provides a longitudinal bias on trigger lever 11. A second spring 12 connected at one end to a fixed member and connected at its other end to the corresponding other end of trigger lever 11 provides an angular lateral bias on trigger lever 11. The normal or first position or trigger lever 11 is best seen in FIG. 1 of the drawing. In its first position, the end of trigger lever 11 biased by spring 12 is offset relative to lever 2 and hammer lever 4. In this first position, trigger lever 11 abuts against a pawl 10.

Figure 2:
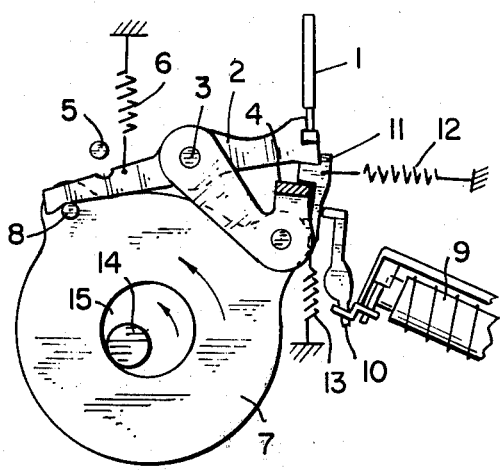
FIG. 2 is a side elevational view, partially in schematic form of the embodiment seen in FIG. 1, the relation of elements in the embodiment being seen in a punch position.

An end of pawl 10 is conductively connected to an electromagnet 9. As best seen in FIG. 2, when electromagnet 9 acts on the conductive end of pawl 10, pawl 10 pivots in its mounting thereby driving trigger lever 11 into its second position between lever 2 hammer lever 4, against the normal bias thereon provided by spring 12.

As the eccentric drive mounted in yoke 7 oscillates yoke 7 trigger lever 11 abuts into lever 2 for thereby longitudinally moving punch lever 1 upwardly until the opposite end of lever 2 abuts into reset pin 8. As punch member 1 is driven by lever 2 it provides a punch hole in a suitably arranged card or paper tape.

Figure 3:
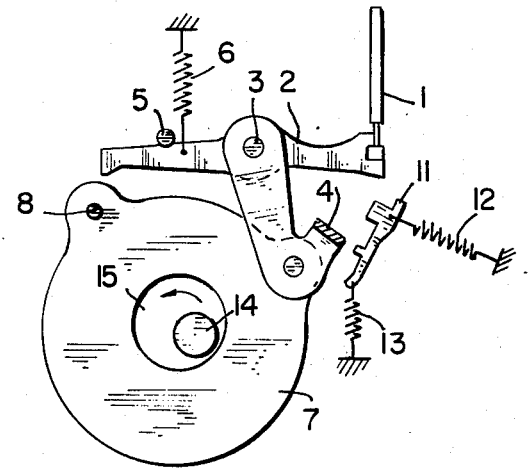
FIG. 3 is a view of the embodiment seen in FIG. 2, showing the elements of the device returning to their normal or at rest position.

As best seen in FIG. 3, when electromagnet 9 is deactivated the counterbias force exerted by pawl 10 on trigger lever 11 is released and trigger lever 11 returns to its first or normal position, also seen in FIG. 1. When trigger lever 11 releases between lever 2 and the camming surface provided on hummer lever 4, reset pin 8 mounted on yoke 7 and hence oscillated thereby, contacts punch lever 2 and returns same to its first position against stopper pin 5. It is to be understood that in FIG. 3, the electromagnet 9 and pawl 10 are not shown merely for the purpose of providing a clear showing of trigger lever 11.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A punch device for coding cards, tapes and the like comprising a punch lever pivotably mounted to be coordinately pivotably displaceable between a first and second position, a punch member coupled to a first end of said punch lever to be displaced thereby, an oscillatable yoke, a hammer lever pivotably mounted to said yoke, said hammer lever being pivotably displaceable in the same pivotable orientation as said punch lever, drive means for oscillating said yoke and hammer lever mounted thereto, a trigger lever coordinately displaceable between a first position offset respectively and mechanically distinct from said hammer lever and said punch lever and a second position between said hammer lever and said punch lever for displacing said punch lever from said first position to said second position in response to said oscillation of said yoke, said punch lever and said hammer lever being pivotably displaced in the same pivotable direction when said trigger lever is disposed in said second position by the displacement of said punch lever from said first to said second position.

2. A punch device as claimed in claim 1, further including reset means mounted on said yoke, said reset means being constructed and arranged to contact said punch lever when said punch lever is in said second displaced position and displace said punch lever from said second position to said first position in response to said oscillation of said yoke.

3. A punch device as claimed in claim 2, and including stopper means for defining said predetermined first position of said punch lever, and biasing means connected to said punch lever for normally biasing said punch lever in contact with said stopper pin.

4. A punch device as claimed in claim 2, further including biasing means for normally biasing said trigger lever into said first position.

5. A punch device as claimed in claim 4, and including a pawl means for coordinately displacing said trigger lever from said first normally biased position to said second position.

6. A punch device as claimed in claim 5, wherein said pawl means includes an electromagnet.

7. A punch device as claimed in claim 2, wherein said drive means includes eccentric drive means mounted to said yoke for oscillatably driving same.

8. A punch device as claimed in claim 2, wherein said punch lever and said hammer lever are pivotally disposed about the same pivot 14.

* * * * *